Nov. 22, 1960  F. R. HART, JR  2,960,950
METHOD OF MAKING REFLECTOR
Filed July 31, 1952  3 Sheets-Sheet 1

INVENTOR.
FREDERICK R. HART, JR.
BY Rines and Rines
ATTORNEYS

Nov. 22, 1960  F. R. HART, JR  2,960,950
METHOD OF MAKING REFLECTOR
Filed July 31, 1952  3 Sheets-Sheet 2

INVENTOR.
FREDERICK R. HART, JR.
BY Rines and Rines
ATTORNEYS

Nov. 22, 1960     F. R. HART, JR     2,960,950
METHOD OF MAKING REFLECTOR
Filed July 31, 1952     3 Sheets-Sheet 3
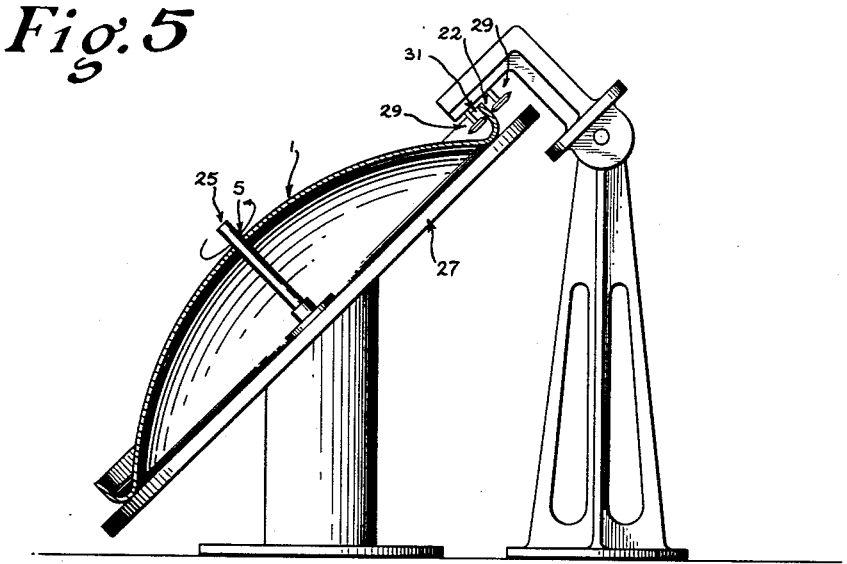
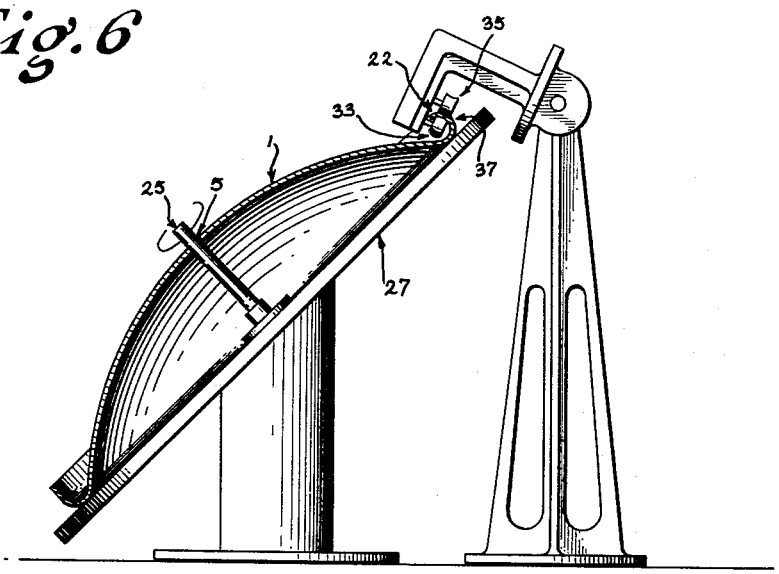
INVENTOR.
FREDERICK R. HART, JR.
BY Rines and Rines
ATTORNEYS United States Patent Office 2,960,950
Patented Nov. 22, 1960

2,960,950
METHOD OF MAKING REFLECTOR

Frederick R. Hart, Jr., West Concord, Mass., assignor to The Gabriel Company, Cleveland, Ohio, a corporation of Ohio Filed July 31, 1952, Ser. No. 301,820

2 Claims. (Cl. 113—51)

The present invention relates to methods of making reflectors, and more particularly to methods of fabricating radio-frequency microwave reflectors.

Radio-frequency reflectors, as of paraboloidal contour, are presently manufactured in a number of different ways. In accordance with one manufacturing technique, a forming tool is pressed by an operator against a spinning surface of conducting sheet metal in order to impart the desired paraboloidal or other contour to the sheet. This technique, however, is not only time-consuming, but it is subject to the skill or lack of skill of the operator, and it does not lend itself to mass production. Reflectors have also been formed of perforated or expanded metal or wire mesh, and the like. In general, such perforated or expanded-metal or wire-mesh reflectors are fabricated in sections or, in the case of small reflectors, in a complete reflector unit by the above-mentioned spinning process or by die-stamping. The perforated or expanded metal or the wire mesh is fused or otherwise secured to a frame. This technique, too, is subject to the disadvantage that it requires a considerable length of time of manufacture, and its results depend to a large extent upon the skill of the assembler. The securing of the reflector sections to the frame, indeed, requires a weld that is extremely difficult to accomplish without producing distortion of the frame. In the case of light-wave reflectors and the like, as for example, those utilized for automobile headlights, die-stamping techniques have been utilized, but these require the procurement of expensive dies and are adapted only to reflectors of relatively small size. Articles such as hubcaps and the like have also been formed by stamping techniques, but again these techniques are not particularly adapted to the mass production of radio-frequency microwave reflectors of the considerable size necessary to provide highly directive radio-wave beams.

An object of the present invention is to provide a new and improved method of making a reflector that is particularly adapted for the microwave radio-frequency range, and a method that is not subject to the above-mentioned disadvantages.

A further object is to provide a new and improved method of forming a reflector that lends itself to mass production, and that requires a minimum of specialized equipment for manufacture.

Still a further object is to provide a new and improved method of forming a reflector that is not subject to the skill or lack of skill of the operator or assembler.

Other and further objects will be explained hereinafter and will be more particularly pointed out in the appended claims.

The invention will now be described in connection with the accompanying drawings, Fig. 1 of which is a perspective view, partly cut away, illustrating the first step of the preferred fabricating method of the present invention;

Figs. 5 and 6 are perspective views, partly in section, of edge-cutting and bending steps, respectively.

In summary, the invention relates to a method of forming a reflector from sheet metal or similar material that is pressed in one direction along a closed curved region thereof, and simultaneously pressed in the opposite direction in a region inside the closed-curved region. Thereafter, while the pressure is continued at the said inside region, the material is pressed continuously in the said opposite direction progressively outward from the said inside region toward the closed curved region, thereby to stretch the sheet material into a surface the curvature of which is predetermined by the progressively outward pressure. Preferred method steps are discussed in detail hereinafter.

Figure 1:
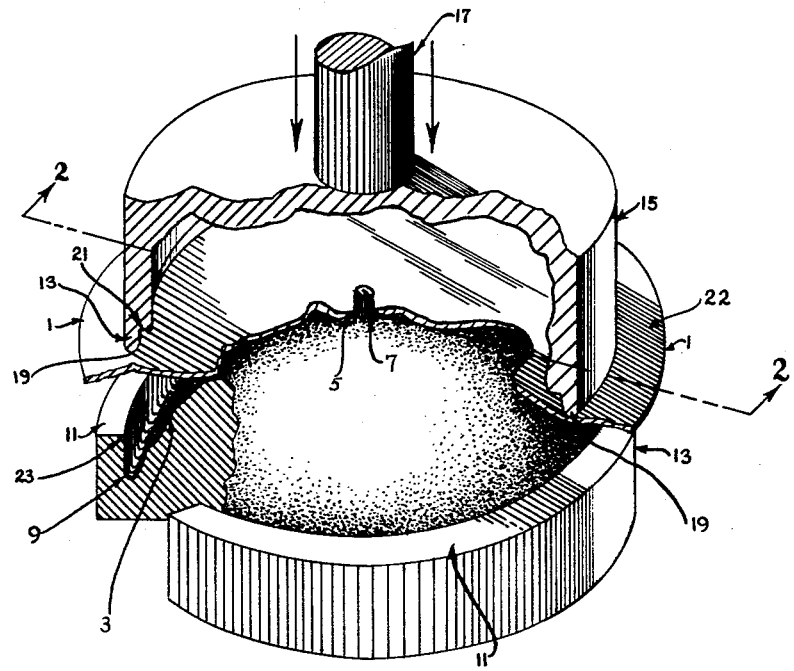

Referring to Fig. 1, a piece of sheet material 1 is shown resting upon a form 3 having a three-dimensional contour that it is desired to impart to the sheet 1 in order to form the desired reflector. This contour is illustrated as that of a symmetrical paraboloid. The sheet 1 is shown of circular contour, though this is not essential. It is also shown provided with a central aperture 5 for receiving a mounting pin 7 that may be carried at the top of the form 3 at the vertex of the said paraboloid. The sheet material may be of metal, such as sheet aluminum or sheet magnesium and the like, of the order of one-eighth of an inch thick, more or less. The form 3 may also be of metal, such as cast iron, or it may be formed of hard wood, or other substance, shaped into the desired contour. Near the periphery of the form 3, a recess is provided in the form of a circular rounded groove 9 having an outer flange ring 11. An annular pressure ring 13 having substantially the same rounded contour as the contour of the groove 9 is carried by a plunger mechanism 15 that may be moved up and down, in the direction of the arrows, as by an hydraulically or otherwise operated piston 17. The member 15 is hollow in order that it may be forced downward over the form 3 about which the sheet material 1 is to be stretched, as later described. In Fig. 1, the bottom of the pressure ring 13 is shown just contacting the sheet 1 along a closed curve region 19 thereof, during the downward stroke of the plunger mechanism 15.

Figure 2:
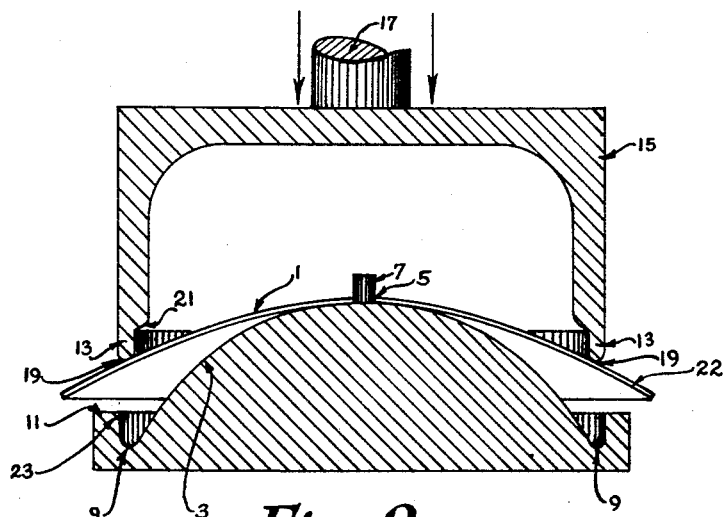
Figs. 2, 3 and 4 are sectional views taken upon the line 2, 2 of Fig. 1 looking in the direction of the arrows, and illustrating successive positions of the fabricating equipment during the formation of the reflector.

The relation of the parts a moment later, during the further downward movement of the plunger mechanism 15, is illustrated in Fig. 2. The upper portion of the form 3 in the neighborhood of the pin 7 then presses upward at the central region of the sheet 1 in opposition to the downward-direction pressure along the closed-curve region 19 by the pressure ring 13. This effects the commencement of curvedly deforming or bending the sheet material 1.

Figure 3:
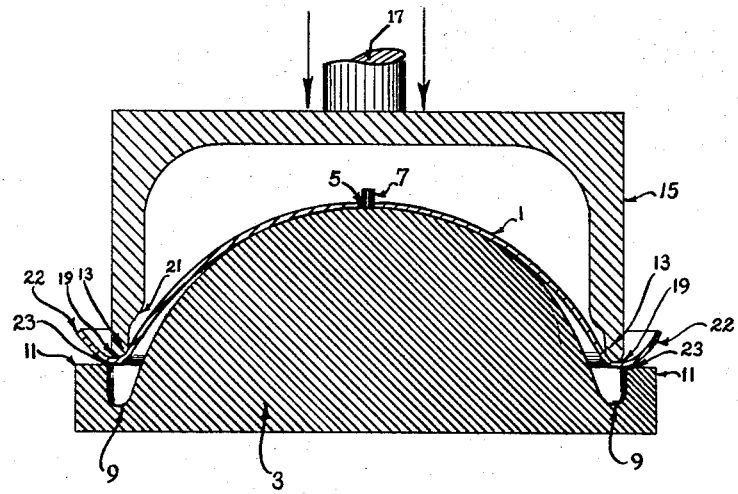
Figure 4:
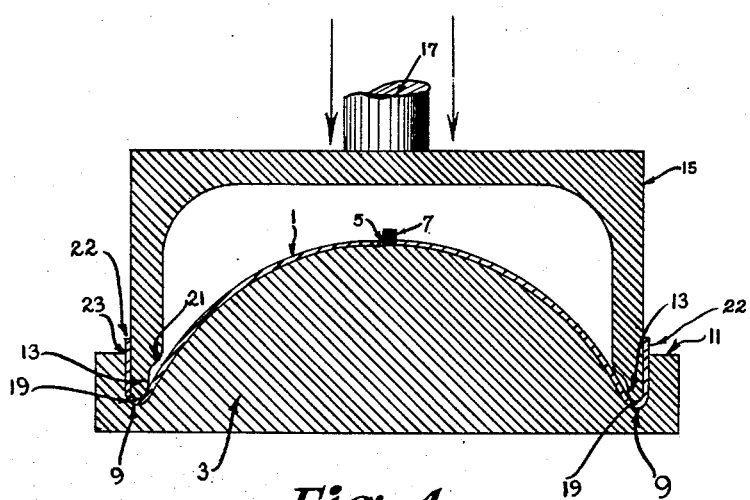

Further successive positions of the member 15 are shown in Figs 3 and 4. In Fig 3, the sheet material 1 has been depressed in the vicinity of the closed-curve region 19, which region is about to be forced into the upper opening of the groove 9. It will be observed by comparing Figs. 2 and 3, that, during the continued pressure at the central region of the sheet 1 by the top-most portion of the form 3, pressure is also exerted continuously and progressively outward from this inside region toward the closed-curve region 19, causing further bending of the sheet material 1 and a greater area of contact between the sheet material and the form 3. The peripheral portion of the sheet material 1 outside and enveloping the closed-curve region 19, moreover, has engaged the inner edge 23 of the flange ring 11, Upward pressure becomes thus exerted along the portion of the sheet material 1 adjacent the second closed-curve region defined by the said edge 23 of the flange ring 11, in a direction opposite to the downward direction of pressure exerted upon the closed-curve region 19 by the pressure ring 13. This causes the peripheral portions of the sheet material to become simultaneously reversely bent upward, as shown in Fig. 3, and it commences to effect stretching of the material 1 in addition to its before-described bending.

In Fig. 4, the pressure ring 13 has become completely forced into the groove 9 with the region 19 of the sheet material 1 disposed therebetween. The inner wall of the member 15 carrying the pressure ring 13 is cut away at 21 in order to remain clear of the sheet material 1 as the same is stretch-formed along the form 3. The peripheral portion 22 of the sheet material 1 has now become forced between the inner wall of the flange 11 and the outer wall of the member 15. During the stretching of the sheet material, after its engagement with the inner edge 23 of the flange ring 11 and the continued downward pulling of the sheet material along 19, furthermore, it has been found that wrinkles that may be formed in the material 1 are carried progressively outward to the ends of the sheet material so that in the final position of Fig. 4, such imperfections exist only in the peripheral portion 22.

Figure 7:
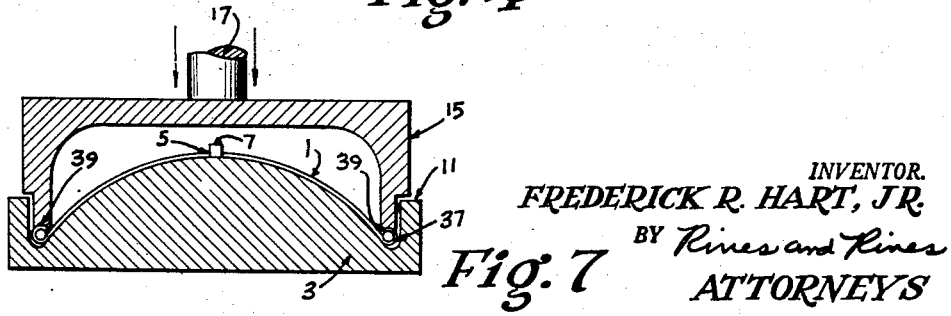
Fig. 7 is a view similar to Figs. 2, 3 and 4 of a final step in the fabrication of the reflector.

The stretch-formed reflector 1 is now ready for finishing. In Fig. 5, it is shown mounted through the vertex aperture 5 upon a spindle 25 carried by a preferably inclined rotatable platform 27. Rotation of the platform 27 in the direction of the arrow carries with it the reflector 1. A pair of cutters 29 may be positioned over the peripheral portion 22 of the sheet material 1 in order to cut off the very end portion 31 thereof that may contain the before-mentioned wrinkles or other imperfections. While disposed on the same inclined rotatable platform 27, the reflector 1 may then be operated upon by a concave curler roll 33 and a convex cooperating curler roll 35 positioned intermediate the remaining peripheral portion 22 of the reflector. The cooperating curler rolls 33 and 35 thus further reversely bend the remaining peripheral portion 22 into a bead 37. A final step for carrying the bead 37 back closer to the reverse side of the reflector 1 may, if desired, be effected as shown in Fig. 7. The reflector 1 has been replaced over the form 3, but substituted for the member 15—13, is a further similar plunger member 15' carrying an inwardly off set concave punch or pressing surface 39 for bending the bead 37 against or substantially against the rear surface of the reflector 1. Waveguide, coaxial-line or other types of feed (not shown) may be passed through the aperture 5 at the vertex of the completed reflector 1 to illuminate the same with microwave radio-frequency energy as is well-known in the art.

When magnesium, as distinguished from aluminum, is to be utilized as the sheet material 1 or where relatively thick sheet material is to be employed, it may be desirable to provide for heating the sheet material as it is stretch-formed. The form 3, for example, may be hollow, to permit the placement of gas jets, electric heating coils or other heating devices therein, similar heating means being disposed within the hollow of plunger member 15, if desired.

While the invention has heretofore been described in connection with the forming of reflectors of symmetrical contour, it is to be understood that the invention is equally applicable to the formation of unsymmetrical reflectors which cannot be formed by the before-described spinning technique, and are difficult to form by the before-described die-stamping or other techniques. It is, of course, possible to spin a massive reflector and to cut unsymmetrical sections therefrom, but this is quite difficult and costly. The present invention, on the other hand, easily lends itself to the formation of unsymmetrical reflectors merely by employing suitably shaped forms 3, grooves 9 and pressure rings 13.

It has been found possible thus to form reflectors of the character described in a matter of a tenth or less of the time that has heretofore been required to fabricate such microwave reflectors by prior-art techniques. The present invention, furthermore, lends itself to mass production, is not dependent upon the skill of the operator, and is particularly well adapted for the formation of unsymmetrical reflectors.

Further modifications will occur to those skilled in the art, and all such are considered to fall within the spirit and scope of the invention as defined in the appended claims.

What is claimed is:

1. In the art of manufacturing large radio wave reflectors from metal sheet material or the like, a method of curving said sheet material that comprises pressing in one direction along only a closed-curve region of the sheet material that is narrow compared to the area of said material; pressing in the opposite direction only at a limited region inside the closed-curve region; thereafter, while continuing to press at the inside region, pressing continuously in the said opposite direction progressively outwardly along a predetermined convex surface from the said inside region toward the closed-curve region, thereby to stretch the sheet material progressively outwardly to conform to the curvature of said surface; and thereafter while continuing the progressively outward stretching along said convex surface pressing in said opposite direction outside said closed-curve region to reversely bend the peripheral portion of the sheet material outside the closed-curve region and to direct the peripheral portion in a direction opposite to the said one direction, while maintaining the progressively outward stretching along the portions of the said surface inside and immediately adjacent the closed-curve region, the pressure in said one direction along only said closed-curve region being maintained throughout the entire operation.

2. In the art of manufacturing large radio wave reflectors from metal sheet material or the like, a method of curving said sheet material that comprises pressing in one direction along only a closed-curve region of the sheet material that is narrow compared to the area of said material; pressing in the opposite direction only at a limited region inside the closed-curve region; thereafter, while continuing to press at the said inside region, pressing continuously in the said opposite direction progressively outwardly along a predetermined convex paraboloidal surface of revolution from the said inside region toward the closed-curve region, thereby to stretch the sheet material progressively outwardly into a paraboloidal surface of revolution corresponding to the predetermined paraboloidal surface of revolution; and thereafter while continuing the progressively outward stretching along said paraboloidal surface pressing in said opposite direction outside said closed-curve region to reversely bend the peripheral portion of the sheet material outside the closed-curve region and to direct the peripheral portion in a direction opposite to the said one direction, while maintaining the progressively outward stretching along the portions of the paraboloidal surface of revolution inside and immediately adjacent the closed-curve region, the pressure in said one direction along only said closed-curve region being maintained throughout the entire operation.

References Cited in the file of this patent

UNITED STATES PATENTS

| | | |
|---|---|---|
| 316,600 | Brown | Apr. 28, 1885 |
| 1,112,164 | Rundquist | Sept. 29, 1914 |
| 1,176,235 | Moru | Mar. 21, 1916 |

(Other references on following page)

UNITED STATES PATENTS

| | | |
|---|---|---|
| 1,568,283 | Kuen | Jan. 5, 1926 |
| 1,672,694 | Shrum | June 5, 1928 |
| 1,779,974 | Magee | Oct. 28, 1930 |
| 1,841,920 | Smith | Jan. 19, 1932 |
| 1,982,318 | Oestnaes | Nov. 27, 1934 |
| 2,014,815 | Rutledge | Sept. 17, 1935 |
| 2,079,126 | Maas | May 4, 1937 |
| 2,136,308 | Miller | Nov. 8, 1938 |
| 2,258,875 | Arras | Oct. 14, 1941 |
| 2,332,926 | May | Oct. 26, 1943 |
| 2,415,788 | Champer | Feb. 11, 1947 |
| 2,602,411 | Schnell | July 8, 1952 |

FOREIGN PATENTS

| | | |
|---|---|---|
| 597,323 | Germany | Mar. 22, 1934 |